(12) United States Patent
DeCusatis et al.

(10) Patent No.: US 6,995,695 B1
(45) Date of Patent: Feb. 7, 2006

(54) SYSTEM, METHOD, AND ARTICLE OF MANUFACTURE FOR SYNCHRONIZING RUNNING DISPARITY VALUES IN A COMPUTER AND A DATA DEMAPPING DEVICE

(75) Inventors: Casimer Maurice DeCusatis, Poughkeepsie, NY (US); Thomas A. Gregg, Highland, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/046,394

(22) Filed: Jan. 28, 2005

(51) Int. Cl.
*H03M 7/00* (2006.01)
(52) U.S. Cl. .......................... 341/59; 341/58
(58) Field of Classification Search ................. 341/59
See application file for complete search history.

(56) References Cited

U.S. PATENT DOCUMENTS

| | | | | |
|---|---|---|---|---|
| 6,054,944 A | * | 4/2000 | Yamashita | 341/95 |
| 6,188,337 B1 | * | 2/2001 | Soljanin | 341/59 |
| 6,304,196 B1 | * | 10/2001 | Copeland et al. | 341/58 |
| 6,545,691 B1 | | 4/2003 | Vallejo | 345/804 |
| 6,560,607 B1 | | 5/2003 | Lassesen | 707/101 |
| 6,700,510 B1 | * | 3/2004 | Kryzak et al. | 341/59 |
| 6,747,580 B1 | * | 6/2004 | Schmidt | 341/50 |
| 6,816,509 B2 | | 11/2004 | Pelley et al. | 370/466 |
| 6,842,126 B1 | * | 1/2005 | Tsai et al. | 341/102 |
| 2002/0090007 A1 | | 7/2002 | Kamiya et al. | 370/476 |
| 2003/0061375 A1 | | 3/2003 | Gregg et al. | 709/237 |
| 2004/0085904 A1 | | 5/2004 | Bordogna et al. | 370/236 |
| 2004/0100958 A1 | | 5/2004 | Peng | 370/392 |
| 2004/0202205 A1 | * | 10/2004 | Sheth et al. | 370/539 |

* cited by examiner

*Primary Examiner*—Linh V. Nguyen
(74) *Attorney, Agent, or Firm*—William A. Kinnaman, Jr.; Cantor Colburn LLP (57) ABSTRACT

A system and a method for synchronizing running disparity values in a first computer and a data demapping device are provided. The method includes generating a plurality of data characters and a synchronization control character. The method further includes iteratively determining a first running disparity value based on each character of the plurality of data characters and the synchronization control character. The method further includes encapsulating a first plurality of data characters and the synchronization control character from a computer into at least one GFP data block and transmitting the GFP data block to data demapping device. The method further includes decoding the GFP data block to obtain the plurality of data characters and the synchronization control character and iteratively determining a second running disparity value based on each character of the plurality of data characters and the synchronization control character. The method further includes setting the second running disparity value in the data demapping device equal to either a positive running disparity value or a negative running disparity value based on the synchronization control character to synchronize the second running disparity value and the first running disparity value.

20 Claims, 9 Drawing Sheets

MAPPING BETWEEN 8B/10B CONTROL CHARACTERS AND THE 64B/65B CONTROL CODE INDICATORS

| NAME | OCTET VALUE | 10B CODEWORD (RD-) abcdei fghj | 10B CODEWORD (RD+) abcdei fghj | 64B/65B 4-BIT MAPPING |
|---|---|---|---|---|
| K28.0 | 1C | 001111 0100 | 110000 1011 | 0000 |
| K28.1 | 3C | 001111 1001 | 110000 0110 | 0001 |
| K28.2 | 5C | 001111 0101 | 110000 1010 | 0010 |
| K28.3 | 7C | 001111 0011 | 110000 1100 | 0011 |
| K28.4 | 9C | 001111 0010 | 110000 1101 | 0100 |
| +K28.5 | BC | 001111 1010 | N/A | 0101 |
| K28.6 | DC | 001111 0110 | 110000 1001 | 0110 |
| K28.7 | FC | 001111 1000 | 110000 0111 | 0111 |
| K23.7 | F7 | 111010 1000 | 000101 0111 | 1000 |
| K27.7 | FB | 110110 1000 | 001001 0111 | 1001 |
| K29.7 | FD | 101110 1000 | 010001 0111 | 1010 |
| K30.7 | FE | 011110 1000 | 100001 0111 | 1011 |
| 10B_ERR | 01 | UNRECOGNIZED RD- | UNRECOGNIZED RD+ | 1100 |
| 65B_PAD | 02 | N/A | N/A | 1101 |
| -K.28.5 | BC | N/A | 11 0000 0101 | 1110 |
| SPARE | 04 | N/A | N/A | 1111 |

SYSTEM, METHOD, AND ARTICLE OF MANUFACTURE FOR SYNCHRONIZING RUNNING DISPARITY VALUES IN A COMPUTER AND A DATA DEMAPPING DEVICE

FIELD OF INVENTION

The invention relates to a system, a method, and an article of manufacture for synchronizing running disparity values in a computer and a data demapping device.

BACKGROUND OF INVENTION

The Generic Framing Procedure (GFP) is a telecommunication standard that has been implemented for generating data blocks using a predetermined protocol for transmission over a synchronous optical communication network (SONET) communication network. Telecommunication carriers and other service providers have implemented SONET networks for transmitting GFP data blocks between communication devices.

Serial communication systems transmit a sequence of logic 1-bits and logic 0-bits representing characters. A disparity value associated with a character is a difference between the number of logic 1-bits and 0-bits representing that character. If there are more 1-bits than 0-bits in the character, the disparity value is defined as being a positive disparity value. If there are fewer 1-bits than 0-bits, the disparity value is defined as being a negative disparity value. If the number of 1-bits and 0-bits are equal to one another, the disparity value is defined as a neutral or a zero disparity value.

A running disparity value indicates a difference between the number of logic 1 bits and the logic 0 bits at a particular instant in time during a transmission of bits. Communication systems calculate running disparity values associated with data transmitted from a transmitting device to a receiving device for (i) adjusting an average polarity of the signals toward a predetermined polarity level, and (ii) detecting errors during the transmission of the data at the receiving device.

A problem associated with a GFP data block is that when data is encapsulated in the GFP data block, running disparity information is not included within the GFP data blocks. Accordingly, currently devices that utilize running disparity information for error detection cannot utilize the GFP data blocks when transmitting data over a SONET communication network.

Thus, the inventors herein have recognized a need for a system and a method for synchronizing running disparity values in a first computer and a data demapping device associated with GFP data blocks transmitted from the first computer to the data demapping device.

SUMMARY OF INVENTION

A method for synchronizing running disparity values in a first computer and a data demapping device in accordance with an exemplary embodiment is provided. The method includes generating a plurality of data characters and a synchronization control character. The method further includes iteratively determining a first running disparity value based on each character of the plurality of data characters and the synchronization control character. The method further includes transmitting the plurality of data characters and the synchronization control character from the first computer to a third data mapping device. The synchronization control character indicates whether the first running disparity value has a positive running disparity value or a negative running disparity value when the synchronization control character is transmitted. The method further includes encapsulating the first plurality of data characters and the synchronization control character into at least one GFP data block at the third data mapping device and transmitting the GFP data block from the third data mapping device to a fourth data demapping device. The method further includes decoding the GFP data block to obtain the plurality of data characters and the synchronization control character at the fourth data demapping device and iteratively determining a second running disparity value based on each character of the plurality of data characters and the synchronization control character. The method further includes setting the second running disparity value in the fourth data demapping device equal to either a positive running disparity value or a negative running disparity value based on the synchronization control character to synchronize the second running disparity value and the first running disparity value.

A system for synchronizing running disparity values in accordance with another exemplary embodiment is provided. The system includes a first computer configured to generate a plurality of data characters and a synchronization control character. The first computer is further configured to iteratively determine a first running disparity value based on each character of the plurality of data characters and the synchronization control character. The first computer is further configured to transmit the plurality of data characters and the synchronization control character from the first computer to a third data mapping device. The synchronization control character indicates whether the first running disparity value has a positive running disparity value or a negative running disparity value when the synchronization control character is transmitted. The system further includes the third data mapping device configured to encapsulate the first plurality of data characters and the synchronization control character into at least one GFP data block and to transmit the GFP data block to a fourth data demapping device. The fourth data demapping device is configured to decode the GFP data block to obtain the plurality of data characters and the synchronization control character and to iteratively determine a second running disparity value based on each character of the plurality of data characters and the synchronization control character. The fourth data demapping device is further configured to set the second running disparity value equal to either a positive running disparity value or a negative running disparity value based on the synchronization control character to synchronize the second running disparity value and the first running disparity value.

An article of manufacture in accordance with another exemplary embodiment is provided. The article manufacture includes a computer storage medium having a computer program encoded therein for synchronizing running disparity values in a first computer and a demapping device. The computer storage medium includes code for generating a plurality of data characters and a synchronization control character. The computer storage medium further includes code for iteratively determining a first running disparity value based on each character of the plurality of data characters and the synchronization control character. The computer storage medium further includes code for transmitting the plurality of data characters and the synchronization control character from the first computer to a third data mapping device. The synchronization control character indicates whether the first running disparity value has a positive running disparity value or a negative running disparity value when the synchronization control character is transmitted. The computer storage medium further includes code for encapsulating the first plurality of data characters and the synchronization control character into at least one GFP data block at the third data mapping device and transmitting the GFP data block from the third data mapping device to a fourth data demapping device. The computer storage medium further includes code for decoding the GFP data block to obtain the plurality of data characters and the synchronization control character at the fourth data demapping device and iteratively determining a second running disparity value based on each character of the plurality of data characters and the synchronization control character. The computer storage medium further includes code for setting the second running disparity value in the fourth data demapping device equal to either a positive running disparity value or a negative running disparity value based on the synchronization control character to synchronize the second running disparity value and the first running disparity value.

Other systems, methods and/or computer program products according to the embodiments will be or become apparent to one with skill in the art upon review of the following drawings and detailed description. It is intended that at all such additional systems, methods, and/or computer program products be within the scope of the present invention, and be protected by the accompanying claims.

DESCRIPTION OF AN EMBODIMENT

Figure 1:
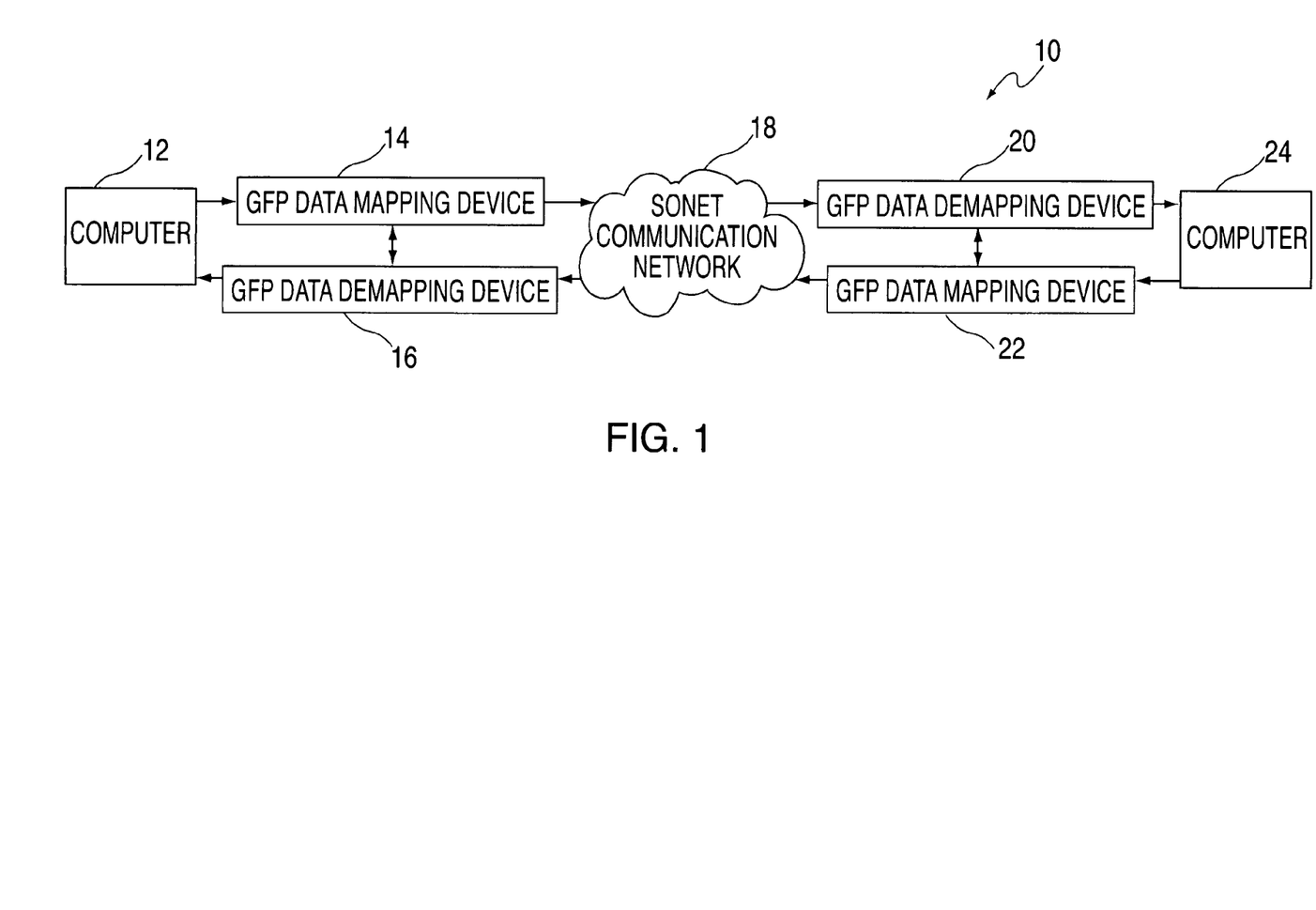
FIG. 1 is a block diagram of a communication system for synchronizing running disparity values in a first computer and a GFP data demapping device.

Referring to FIG. 1, a communication system 10 for synchronizing running disparity values in a computer 12 and the GFP data demapping device 20 in accordance with an exemplary embodiment is illustrated. The system 10 includes a computer 12, a GFP data mapping device 14, a GFP data demapping device 16, a synchronous optical communication network 18, a GFP data demapping device 20, a GFP data mapping device 22, and a computer 24.

The computer 12 is provided to generate a first plurality of data characters and a synchronization control character that will be communicated through the GFP data mapping device 14, the SONET communication network 18, and the GFP data demapping device 20, to the computer 24. In particular, the data characters and the synchronization control character comprise a plurality of 10-bit characters corresponding to 8b/10b code characters. The 8b/10b characters have disparity values of (0, –2, or +2). Further, the 8b/10b code characters can be utilized within the following communication protocols: the ISC protocol, the Fibre Channel protocol, FICON protocol, and the ESCON protocol. The synchronization control character will be utilized to synchronize running disparity values in the computer 12 and the GFP data demapping device 20. As shown, the computer 12 operably communicates with both the GFP data mapping device 14 and the GFP data demapping device 16.

Figure 9:
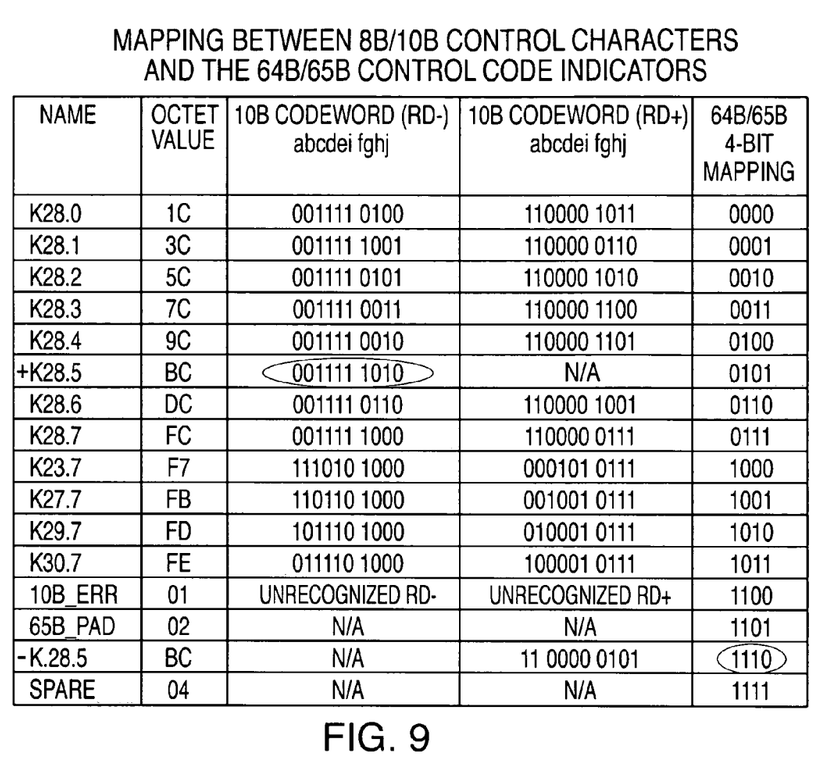
FIG. 9 is a mapping table utilized by the GFP data mapping device of FIG. 2.

Referring to FIG. 9, a brief explanation of the control characters generated by the computer 12 will be explained. As shown, the computer 12 can utilize fourteen pre-defined control characters and two spare control characters. For purposes of this application, however, only the K28.5 control character will be discussed in detail. The control character K28.5 will be utilized for synchronizing running disparity values in the computer 12 and the GFP data demapping device 20. In particular, the control character K28.5 will be utilized to indicate whether the running disparity at the computer 12 has either a positive running disparity value or a negative running disparity value. The control character K28.5 can have one of two bit values. In particular, the control character K28.5 can comprise bit values "001111010" to represent a positive running disparity value, or bit values "1100000101" to represent a negative running disparity value.

Figure 2:
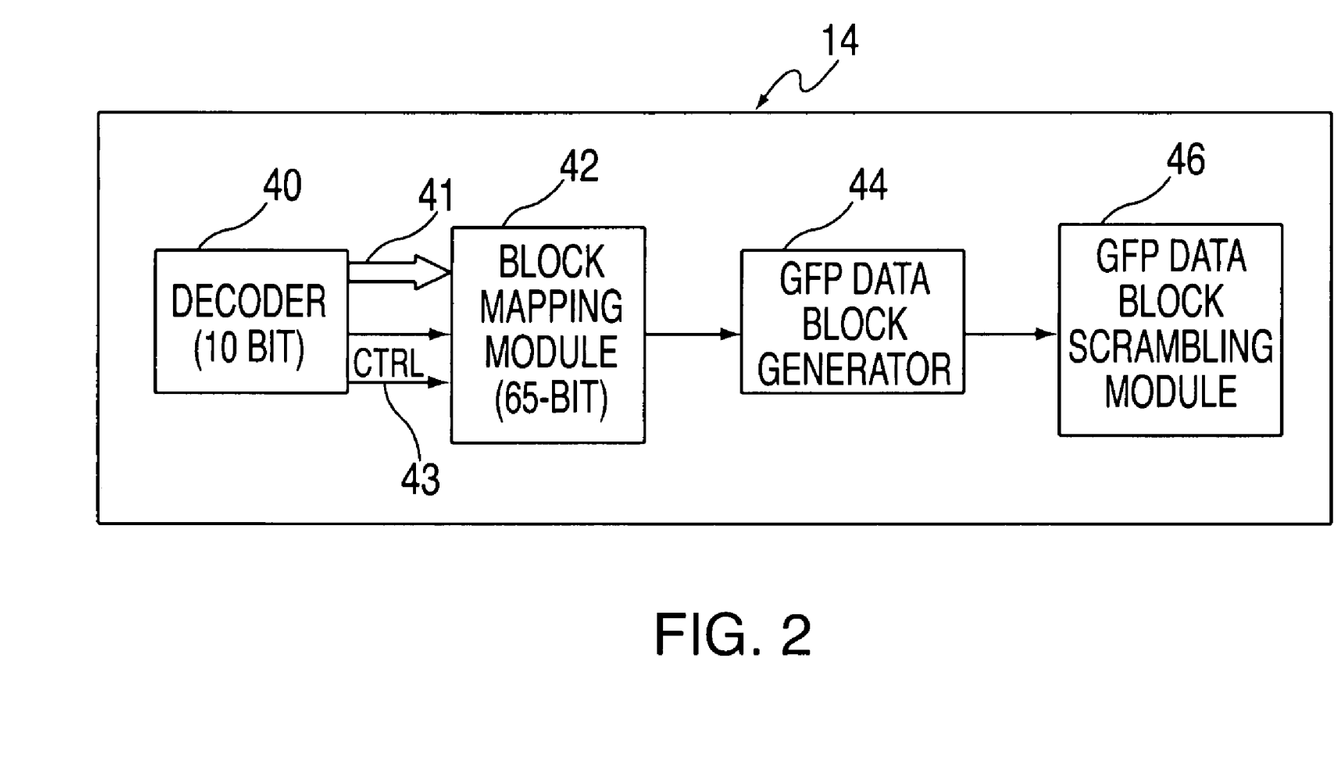
FIG. 2 is a block diagram of a GFP data mapping device utilized in the system of FIG. 1.

Referring to FIGS. 1 and 2, the GFP data mapping device 14 is provided to receive the first plurality of data characters and the synchronization control character from the computer 12 and to encapsulate the characters into one more GFP data blocks. Thereafter, the GFP data mapping device 14 transmits the GFP data blocks through the SONET communication network 18 to the GFP data demapping device 20. In particular, the GFP mapping device 14 maps the synchronization control character "001111010" into a four bit word "0011" indicating a positive running disparity, for transmission in a GFP data block. Further, the GFP mapping device 14 maps the synchronization control character "1100000101" into a four bit word "1110" indicating a negative running disparity, for transmission in a GFP data block.

The GFP data mapping device 14 includes a decoder 40, a block mapping module 42, a GFP data block generator 44, and a GFP data block scrambling module 46. The decoder 40 receives the first plurality of data characters and the synchronization control character, each having 10-bits, from the computer 12. The decoder 40 converts each of the 10-bit characters into 8-bit characters and transmits: (i) the 8-bit characters to the block mapping module 42 via a bus 41, and (ii) a CTRL signal indicating when a synchronization control character is present on bus 41, via a communication line 43 to the module 42.

Figure 10:
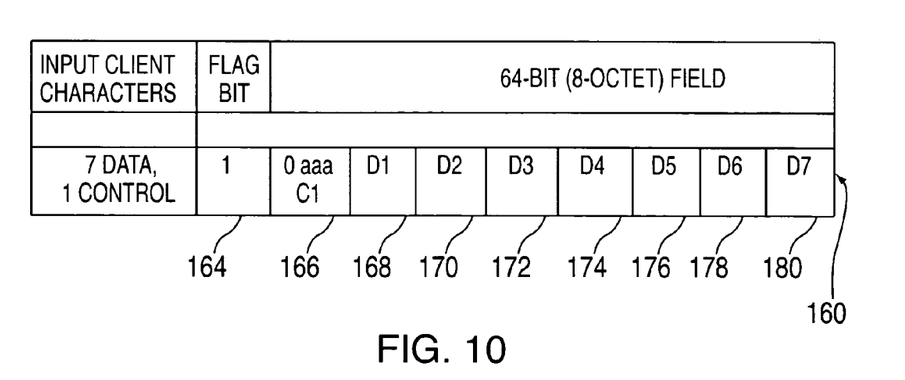
FIG. 10 is a table illustrating fields in a 65-bit data block utilized by the GFP data mapping device of FIG. 2.

The module 42 iteratively encapsulates eight of the 8-bit characters into 65-bit data blocks. Referring to FIG. 10, the structure of one exemplary 65-bit data block having a single control character (e.g., synchronization control character) will be explained. Of course, other configurations of the 65-bit data block would be utilized if more than one control character was contained within the data block, as specified in the ITU-T Generic Framing Procedure G.7041/Y.1303 Specification, which is incorporated herein in its entirety. The 65-bit data block includes a field 164 having a bit value "1" indicating that the data block 160 contains at least one control character. The 65-bit data block further includes a field 166 including a bit value "0" followed by a three bits "aaa" indicating a position of the control character within the data block. The 65-bit data block further includes the fields 168, 170, 172, 174, 176, 178, 180 having the data words D1, D2, D3, D4, D5, D6, D7, respectively. After generating each of the 65-bit data blocks, the module 42 transfers the 65-bit data blocks to the GFP data block generator 44. The GFP data block generator 44 generates a GFP data block comprising eight of the 65-bit data blocks and transfers to the GFP data block to the GFP data block scrambling module 46. The module 46 generates a scrambled GFP data block based on the received GFP data block and transmits the scrambled GFP data block through the SONET communication network to the GFP data demapping device 20.

The SONET communication network 18 is provided to transmit GFP data blocks from the GFP data mapping device 14 to the GFP data demapping device 20. Further, the SONET communication network 18 is provided to transmit GFP data blocks from the GFP data mapping device 22 to the GFP data demapping device 16.

Figure 3:
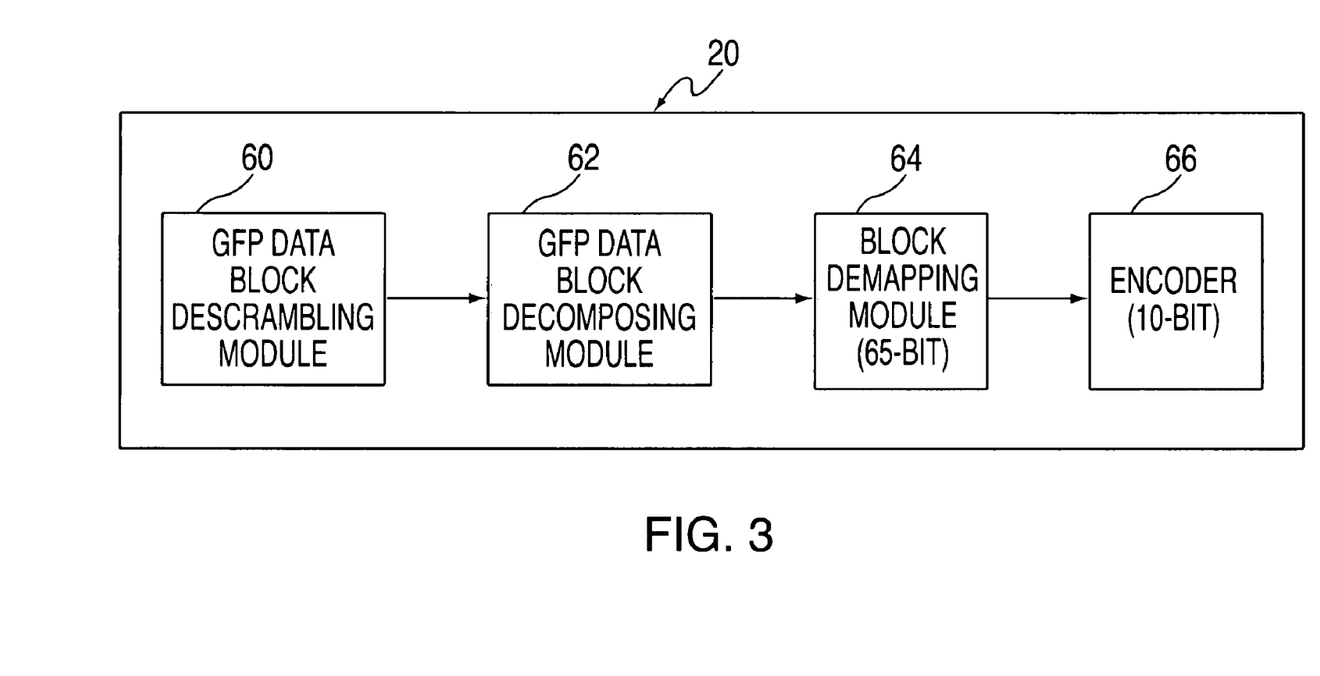
FIG. 3 is a block diagram of a GFP data demapping device utilized in the system of FIG. 1.

Referring to FIGS. 1 and 3, the GFP data demapping device 20 is provided to receive scrambled GFP data blocks from the SONET communication network 18 and to decode the GFP data blocks to obtain the first plurality of data characters and the synchronization control character. Further, the GFP data mapping device 20 is provided to calculate a second running disparity value based upon the received first plurality of data characters and the synchronization control character. In particular, the GFP data mapping device 20 utilizes a received synchronization control character to synchronize the second running disparity value calculated therein with the first running disparity value calculated by the computer 12. The GFP data demapping device 20 operably communicates with the SONET communication network 18 and the computer 24. The device 20 includes a GFP data block descrambling module 60, a GFP data block decomposing module 62, a block demapping module 64, and an encoder 66. The GFP data block descrambling module 60 receives a scrambled GFP data block from the GFP data mapping device 14 and generates a GFP data block that is transmitted to the GFP data block decomposing module 62. The module 62 decomposes the GFP data block to obtain eight 65-bit data blocks and transfers the data blocks to the block demapping module 64. The module 64 retrieves eight 8-bit characters from each of the 65-bit data blocks and transfers the 8-bit characters to the encoder 66. The encoder 66 generates the first plurality of data characters and the synchronization control character comprising 10-bit characters from the received 8-bit characters. Thereafter, the encoder 66 transfers the first plurality of data characters and the synchronization control character to the computer 24.

The computer 24 is provided to receive the first plurality of data characters and the synchronization control character from the GFP data demapping device 20. In particular, the received first plurality of data characters and the synchronization control character comprise a plurality of 10-bit characters corresponding to 8b/10b code characters. Further, the computer 24 is provided to generate a second plurality of data characters and a synchronization control character that will be communicated through the GFP data mapping device 22, the SONET communication network 18, and the GFP data demapping device 16 to the computer 12. The computer 24 operably communicates with both the GFP data mapping device 22 and the GFP data demapping device 20.

The GFP data mapping device 22 is provided to receive the second plurality of data characters into the synchronization control character from the computer 24 and to encapsulate the characters in one more GFP data blocks. Thereafter, the GFP data mapping device 22 transmits the GFP data blocks through the SONET communication network 18 to the GFP data demapping device 16. The GFP data mapping device 22 operably communicates with the SONET communication network 18 and the computer 24. Further, the GFP data mapping device 22 has a substantially similar structure as the GFP data mapping device 14.

The GFP data demapping device 16 is provided to receive scrambled GFP data blocks from the SONET communication network 18 and to decode the GFP data blocks to obtain the second plurality of data characters and the synchronization control character from the computer 24. Further, the GFP data demapping device 16 is provided to transfer the second plurality of data characters and the synchronization control character to the computer 12.

Figure 4:
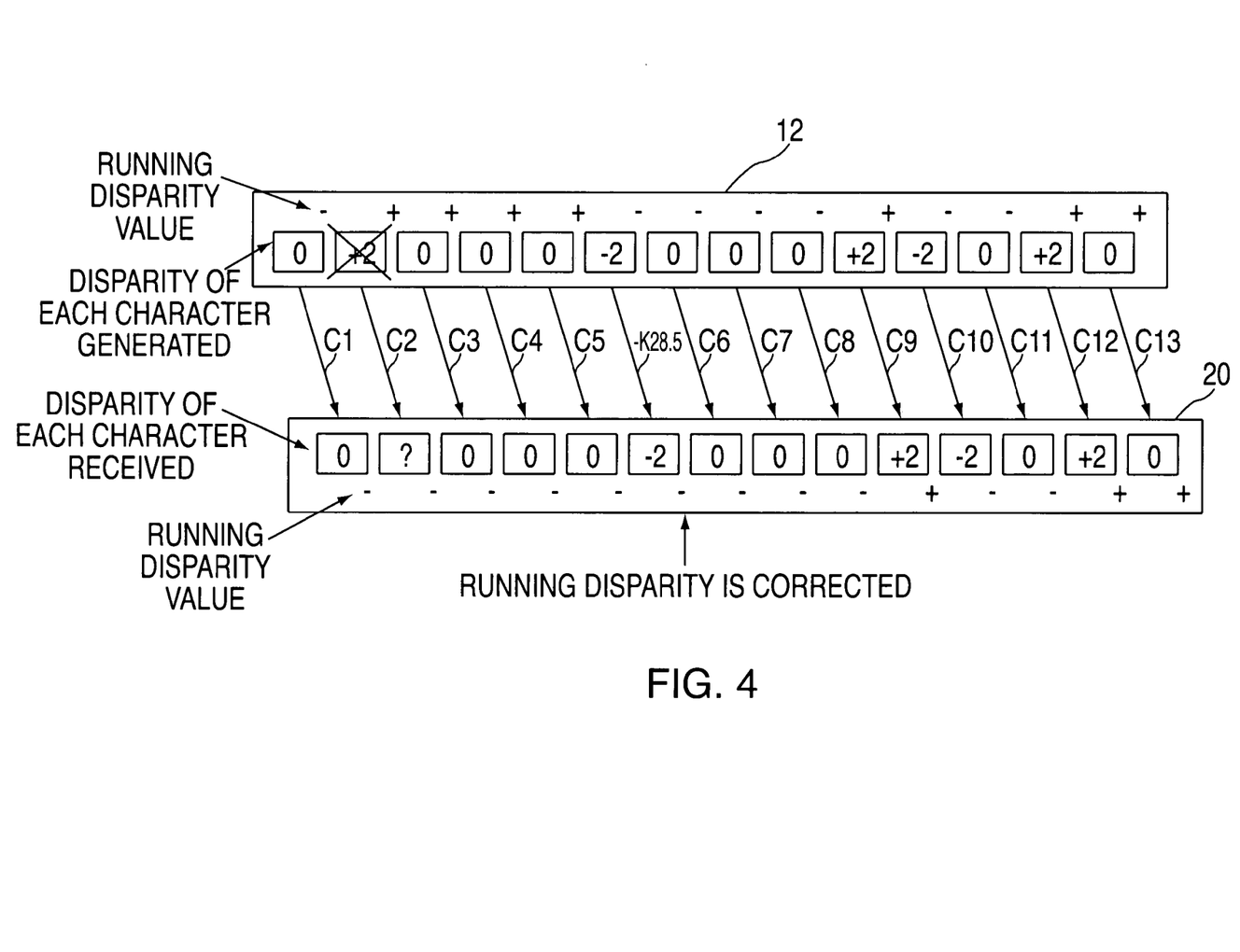
FIG. 4 depicts running disparity values computed at both a first computer and a GFP data demapping device.

Referring to FIG. 4, before providing a detailed description of a method for synchronizing running disparity values, a brief description of the method will be graphically explained. As shown, the data characters C1–13 are sequentially transmitted from the computer 12 to the GFP data demapping device 20 through the SONET communication network 18. The computer 12 calculates a disparity value for each transmitted character. For example, a disparity value associated with the character C1 equals "0". Further, computer 12 calculates a first running disparity value when transmitting each character. For example, the first running disparity value calculated after transmitting the character C1 equals a negative running disparity value. When the data character C2 is transmitted from the computer 12, however, the data character C2 is corrupted during transmission through the network 18. Thus, the GFP data demapping device 20 is not able to recognize the character and therefore does not correctly modify a second running disparity value calculated by the device 20. Accordingly, the second running disparity value in the GFP data demapping device 20, after the transmission of the character C2, is equal to a negative running disparity value which is incorrect. To synchronize the running disparity values in the computer 12 and the GFP data demapping device 20, the computer 12 after transmitting the character C5 transmits a synchronization control character. As shown, in this example, the computer 12 transmits the synchronization control character K28.5, indicating a negative running disparity, to the GFP data demapping device 20. Thereafter, in response to receiving the synchronization control character K28.5, the GFP data demapping device 20 sets the second running disparity value calculated therein to a negative running disparity value to synchronize the first running disparity value in the computer 12 with the second running disparity value in the device 20.

Referring to FIGS. 5–8, a method for synchronizing running disparity values in the computer 12 and the GFP data demapping device 20 will now be explained. The method will be explained utilizing a plurality of data characters and the synchronization control character transmitted from the computer 12 to the GFP data demapping device 20. Of course, the method could be implemented by transmitting a plurality of data characters from the computer 24 to the GFP data demapping device 16. The method is implemented utilizing the communication system 10. Further, the method can be iteratively performed at predetermined times to synchronize the running disparity values in the computer 12 and the device 20.

Figure 5:
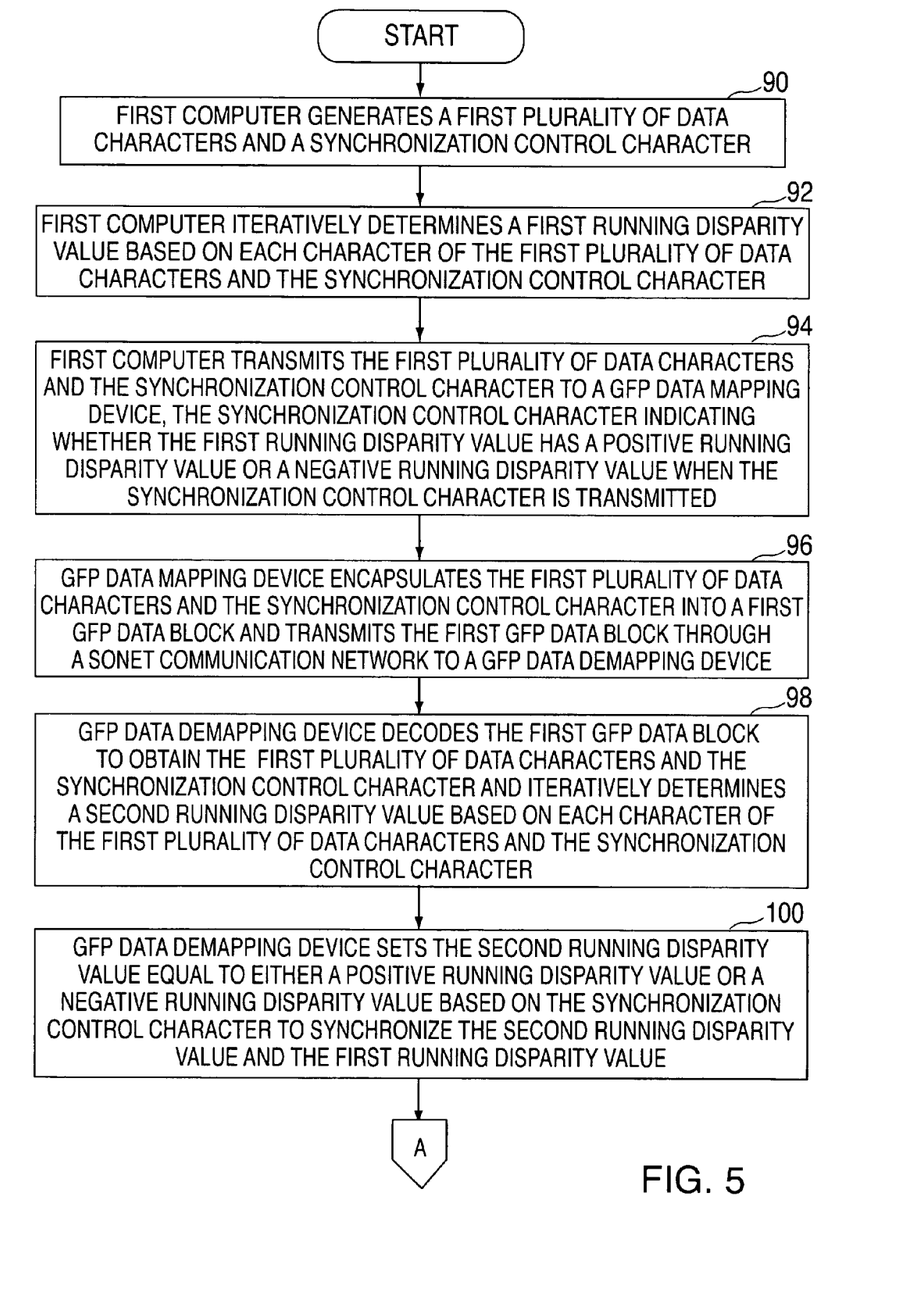
FIGS. 5–8 are flowcharts of a method for synchronizing running disparity values in a computer and a data demapping device.
Figure 6:
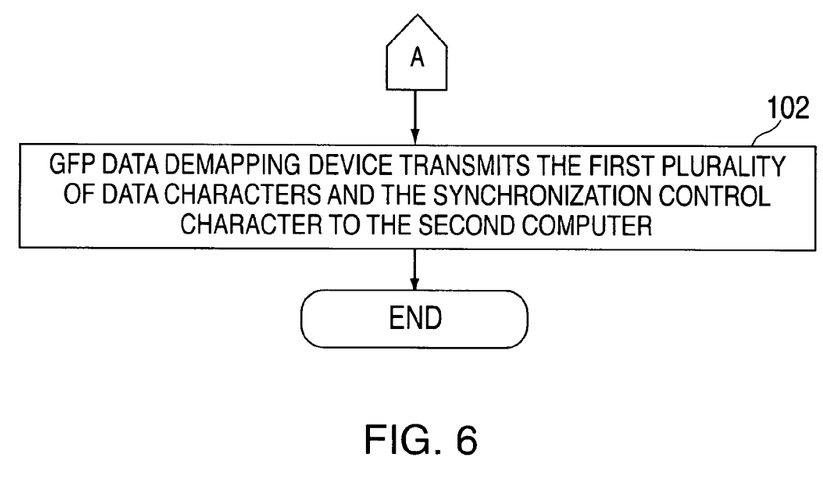

At step 90, the computer 12 generates a first plurality of data characters and a synchronization control character.

At step 92, the computer 12 iteratively determines a first running disparity value based on each character of the first plurality of data characters and the synchronization control character.

At step 94, the computer 12 transmits the first plurality of data characters and the synchronization control character to the GFP data mapping device 14. The synchronization control character indicates whether the first running disparity value has a positive running disparity value or a negative running disparity value when the synchronization control character is transmitted from the computer 12.

Figure 7:
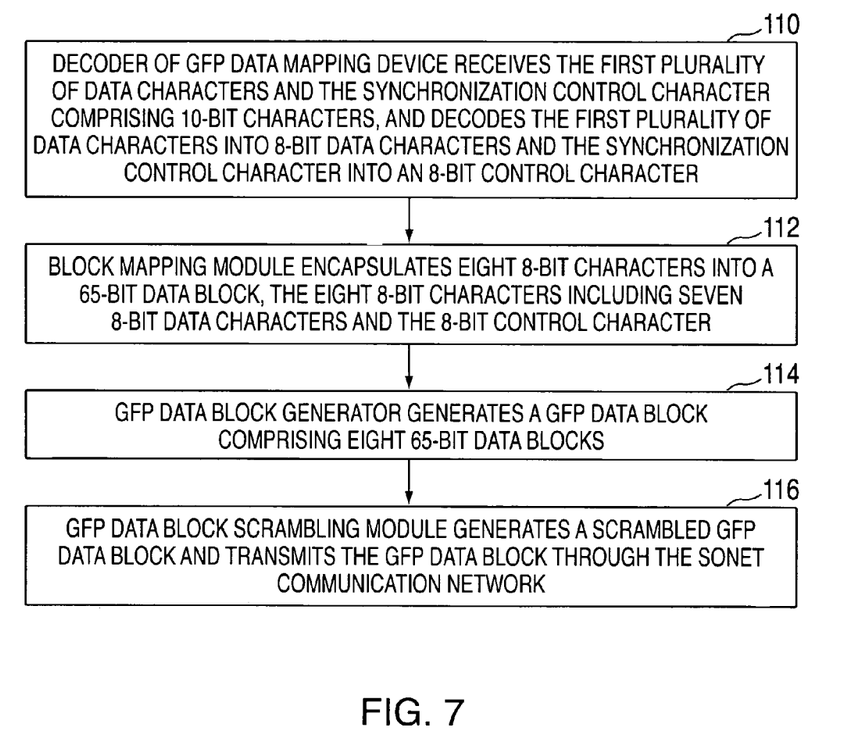

At step 96, the GFP data mapping device 14 encapsulates the first plurality of data characters and the synchronization control character into a first GFP data block and transmits the first GFP data block through a SONET communication network 18 to the GFP data demapping device 20. Referring to FIG. 7, the step 96 is implemented utilizing the steps 110–116 described below.

At step 110, the decoder 40 receives the first plurality of data characters and the synchronization control character comprising 10-bit characters, and decodes the first plurality of data characters into 8-bit data characters and the synchronization control character into an 8-bit synchronization control character.

At step 112, the block mapping module 42 encapsulates eight 8-bit characters into a 65-bit data block, the eight 8-bit characters including seven 8-bit data characters and the 8-bit synchronization control character.

At step 114, the GFP data block generator 44 generates a GFP data block comprising eight 65-bit data blocks.

At step 116, the GFP data block scrambling module 46 generates a scrambled GFP data block and transmits the GFP data block through the SONET communication network 18 to the GFP data demapping device 20.

Figure 8:
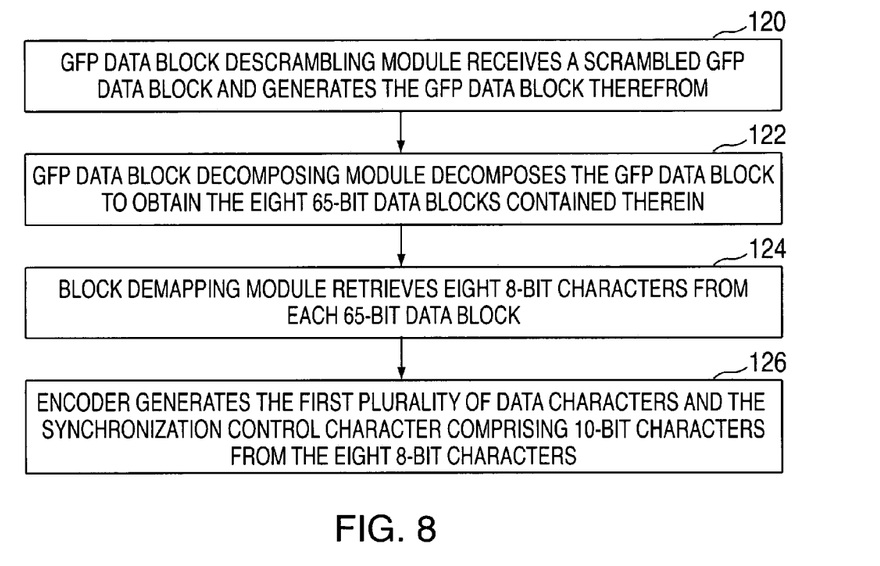

Referring to FIG. 5, after the step 96, the method advances to step 98. At step 98, the GFP data demapping device 20 decodes the first GFP data block to obtain the first plurality of data characters and the synchronization control character and iteratively determines a second running disparity value based on each character of the first plurality of data characters and the synchronization control character. Referring to FIG. 8, the step 96 is implemented utilizing the steps 120–126 described below.

At step 120, the GFP data block descrambling module 60 receives a scrambled GFP data block and generates the GFP data block therefrom.

At step 122, the GFP data block decomposing module 62 decomposes the GFP data block to obtain the eight 65-bit data blocks contained therein.

At step 124, the block demapping module 64 retrieves eight 8-bit characters from each 65-bit data block.

At step 126, the encoder 66 generates the first plurality of data characters and the synchronization control character comprising 10-bit characters from the eight 8-bit characters.

Referring again to FIG. 5, after the step 98, the method advances to step 100. At step 100, the GFP data demapping device 20 sets the second running disparity value equal to either a positive running disparity value or a negative running disparity value based on the synchronization control character to synchronize the second running disparity value and the first running disparity value.

At step 102, the GFP data demapping device 20 transmits the first plurality of data characters and the synchronization control character to the computer 24. After step 102, the method is exited.

The system and the method for synchronizing running disparity values in a computer and a GFP data demapping device provide a substantial advantage over other systems and methods. In particular, the system and the method provide a technical effect of synchronizing running disparity values in the computer and the device by sending at least one synchronization control command in a GFP data block from the computer to the GFP data demapping device.

While the invention is described with reference to an exemplary embodiment, it will be understood by those skilled in the art that various changes may be made an equivalence may be substituted for elements thereof without departing from the scope of the invention. In addition, many modifications may be made to the teachings of the invention to adapt to a particular situation without departing from the scope thereof. Therefore, is intended that the invention not be limited the embodiment disclosed for carrying out this invention, but that the invention includes all embodiments falling with the scope of the intended claims. Moreover, the use of the term's first, second, etc. does not denote any order of importance, but rather the term's first, second, etc. are us are used to distinguish one element from another.

We claim:

1. A method for synchronizing running disparity values in a first computer and a data demapping device, comprising:
   generating a plurality of data characters and a synchronization control character;
   iteratively determining a first running disparity value based on each character of the plurality of data characters and the synchronization control character;
   transmitting the plurality of data characters and the synchronization control character from the first computer to a third data mapping device, the synchronization control character indicating whether the first running disparity value has a positive running disparity value or a negative running disparity value when the synchronization control character is transmitted;
   encapsulating the first plurality of data characters and the synchronization control character into at least one Generic-Framing-Procedures data block at the third data mapping device and transmitting the Generic-Framing-Procedures data block from the third data mapping device to a fourth data demapping device;
   decoding the Generic-Framing-Procedures data block to obtain the plurality of data characters and the synchronization control character at the fourth data demapping device and iteratively determining a second running disparity value based on each character of the plurality of data characters and the synchronization control character; and
   setting the second running disparity value in the fourth data demapping device equal to either a positive running disparity value or a negative running disparity value based on the synchronization control character to synchronize the second running disparity value and the first running disparity value.

2. The method of claim 1, further comprising transmitting the plurality of data characters and the synchronization control character to the second computer.

3. The method of claim 2, wherein transmitting the Generic-Framing-Procedures data block from the third data mapping device to the fourth data demapping device comprises transmitting the Generic-Framing-Procedures data block from the third data mapping device through a synchronous optical communication network to the fourth data demapping device.

4. The method of claim 1, wherein each data character comprises a 10-bit value.

5. The method of claim 1, wherein each synchronization control character comprises a 10-bit value.

6. The method of claim 1, wherein the plurality of data characters comprise at least one of an International-Softswitch-Consortium character stream, a Fibre Channel character stream, a Fibre-Connectivity character stream, and an Enterprise-System-Connectivity character stream.

7. The method of claim 1, wherein the first running disparity value comprises the positive running disparity value when the number of logic 1 bits in both the plurality of data characters and the synchronization control character is greater than the number of logic 0 bits therein.

8. The method of claim 1, wherein the first running disparity value comprises the negative running disparity value when the number of logic 0 bits in both the plurality of data characters and the synchronization control character is greater than the number of logic 1 bits therein.

9. The method of claim 1, wherein the step of encapsulating the first plurality of data characters and the synchronization control character into at least one Generic-Framing-Procedures data block, comprises compressing the first plurality of data characters and the synchronization control character into a 65-bit data block and then encapsulating the 65-bit data block into the Generic-Framing-Procedures data block.

10. The method of claim 1, wherein the step of decoding the Generic-Framing-Procedures data block to obtain the plurality of data characters and the synchronization control character, comprises decoding the Generic-Framing-Procedures data block to obtain the 65-bit data block and then extracting the first plurality of data characters and the synchronization control character from the 65-bit data block.

11. A system for synchronizing running disparity values, comprising:
   a first computer configured to generate a plurality of data characters and a synchronization control character, the first computer further configured to iteratively determine a first running disparity value based on each character of the plurality of data characters and the synchronization control character, the first computer further configured to transmit the plurality of data characters and the synchronization control character from the first computer to a third data mapping device, the synchronization control character indicating whether the first running disparity value has a positive running disparity value or a negative running disparity value when the synchronization control character is transmitted;
   the third data mapping device configured to encapsulate the first plurality of data characters and the synchronization control character into at least one Generic-Framing-Procedures data block and to transmit the Generic-Framing-Procedures data block to a fourth data demapping device; and
   the fourth data demapping device configured to decode the Generic-Framing-Procedures data block to obtain the plurality of data characters and the synchronization control character and to iteratively determine a second running disparity value based on each character of the plurality of data characters and the synchronization control character, the fourth data demapping device further configured to set the second running disparity value equal to either a positive running disparity value or a negative running disparity value based on the synchronization control character to synchronize the second running disparity value and the first running disparity value.

12. The system of claim 11, wherein the fourth data demapping device is further configured to transmit the plurality of data characters and the synchronization control character to the second computer.

13. The system of claim 12, wherein transmitting the Generic-Framing-Procedures data block from the third data mapping device to the fourth data demapping device comprises transmitting the Generic-Framing-Procedures data block from the third data mapping device through a synchronous optical communication network to the fourth data demapping device.

14. The system of claim 11, wherein each data character comprises a 10-bit value.

15. The system of claim 11, wherein each synchronization control character comprises a 10-bit value.

16. The system of claim 11, wherein the plurality of data characters comprise at least one of an International-Softswitch-Consortium character stream, a Fibre Channel character stream, a Fibre-Connectivity character stream, and an Enterprise-System-Connectivity character stream.

17. The system of claim 11, wherein the first running disparity value comprises the positive running disparity value when the number of logic 1 bits in both the plurality of data characters and the synchronization control character is greater than the number of logic 0 bits therein.

18. The system of claim 11, wherein the first running disparity value comprises the negative running disparity value when the number of logic 1 bits in both the plurality of data characters and the synchronization control character is greater than the number of logic 0 bits therein.

19. The system of claim 11, wherein the third data mapping device comprises a data mapping device configured to compress the first plurality of data characters and the synchronization control character into a 65-bit data block and to encapsulate the 65-bit data block into the Generic-Framing-Procedures data block.

20. An article of manufacture, comprising:
   a computer storage medium having a computer program encoded therein for
   synchronizing running disparity values in a first computer and a demapping device, the computer storage medium including:
   code for generating a plurality of data characters and a synchronization control character;
   code for iteratively determining a first running disparity value based on each character of the plurality of data characters and the synchronization control character;
   code for transmitting the plurality of data characters and the synchronization control character from the first computer to a third data mapping device, the synchronization control character indicating whether the first running disparity value has a positive running disparity value or a negative running disparity value when the synchronization control character is transmitted;
   code for encapsulating the first plurality of data characters and the synchronization control character into at least one Generic-Framing-Procedures data block at the third data mapping device and transmitting the Generic-Framing-Procedures data block from the third data mapping device to a fourth data demapping device;
   code for decoding the Generic-Framing-Procedures data block to obtain the plurality of data characters and the synchronization control character at the fourth data demapping device and iteratively determining a second running disparity value based on each character of the plurality of data characters and the synchronization control character; and code for setting the second running disparity value in the fourth data demapping device equal to either a positive running disparity value or a negative running disparity value based on the synchronization control character to synchronize the second running disparity value and the first running disparity value.

* * * * *